United States Patent
Pehlke

(10) Patent No.: US 12,414,048 B2
(45) Date of Patent: *Sep. 9, 2025

(54) INCREASED UPLINK POWER FOR RADIO FREQUENCY COMMUNICATION

(71) Applicant: Skyworks Solutions, Inc., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/765,010

(22) Filed: Jul. 5, 2024

(65) Prior Publication Data

US 2025/0048273 A1    Feb. 6, 2025

Related U.S. Application Data

(63) Continuation of application No. 17/450,117, filed on Oct. 6, 2021, now Pat. No. 12,069,583.

(60) Provisional application No. 63/088,599, filed on Oct. 7, 2020.

(51) Int. Cl.
*H04L 5/14* (2006.01)
*H04W 52/14* (2009.01)

(52) U.S. Cl.
CPC ............ *H04W 52/146* (2013.01); *H04L 5/14* (2013.01)

(58) Field of Classification Search
CPC ............ H04L 5/14; H04L 12/28; H04L 12/50
USPC ........................... 370/329, 401, 405
See application file for complete search history.

(56) References Cited

U.S. PATENT DOCUMENTS

| | | |
|---|---|---|
| 9,866,366 B2 | 1/2018 | Pehlke |
| 10,135,469 B2 | 11/2018 | Chang et al. |
| 10,439,685 B2 | 10/2019 | Pehlke et al. |
| 10,439,789 B2 | 10/2019 | Brunel et al. |
| 10,560,139 B2 | 2/2020 | Brunel et al. |
| 10,581,466 B2 | 3/2020 | Pehlke |
| 10,659,121 B2 | 5/2020 | Pehlke |
| 10,749,582 B2 * | 8/2020 | Forenza ............... H04B 7/0632 |
| 10,944,523 B2 | 3/2021 | Pehlke et al. |
| 11,368,179 B2 | 6/2022 | Pehlke |
| 11,558,079 B2 | 1/2023 | Raghavan et al. |
| 11,558,827 B1 | 1/2023 | Patel et al. |
| 12,069,583 B2 | 8/2024 | Pehlke |
| 2016/0127016 A1 | 5/2016 | Pehlke et al. |
| 2016/0365908 A1 | 12/2016 | Chang et al. |
| 2017/0111074 A1 | 4/2017 | King et al. |
| 2018/0323947 A1 | 11/2018 | Brunel et al. |
| 2020/0162114 A1 | 5/2020 | King et al. |

(Continued)

*Primary Examiner* — Dang T Ton
(74) *Attorney, Agent, or Firm* — Knobbe, Martens, Olson & Bear LLP

(57) ABSTRACT

Systems and methods for high power uplink transmission are disclosed. In one aspect, a mobile device includes an antenna configured to transmit radio frequency signals to a base station via an uplink and receive radio frequency signals from the base station via a downlink and a front end system coupled to the antenna. The front end system is configured to transmit and receive the radio frequency signals from the antenna, and duplex the radio frequency signals via frequency division duplexing. The front end system is further configured to transmit data on the uplink at a first power level that is higher than a predetermined level and at a finite duty cycle.

20 Claims, 11 Drawing Sheets

(56) References Cited

U.S. PATENT DOCUMENTS

| | | |
|---|---|---|
| 2020/0350866 A1 | 11/2020 | Pehlke |
| 2021/0098897 A1 | 4/2021 | Pehlke et al. |
| 2021/0099199 A1 | 4/2021 | Pehlke et al. |
| 2021/0119592 A1 | 4/2021 | Drogi et al. |
| 2021/0211145 A1 | 7/2021 | Loh et al. |
| 2021/0218422 A1 | 7/2021 | Pehlke |
| 2021/0218434 A1 | 7/2021 | Pehlke |
| 2022/0069846 A1 | 3/2022 | Loh et al. |
| 2022/0069850 A1 | 3/2022 | Loh et al. |
| 2022/0103192 A1 | 3/2022 | Pehlke |
| 2022/0231710 A1 | 7/2022 | Pehlke |
| 2022/0286093 A1 | 9/2022 | Drogi et al. |
| 2022/0294486 A1 | 9/2022 | Cao et al. |
| 2023/0065202 A1 | 3/2023 | Pehlke |
| 2023/0155554 A1 | 5/2023 | Balteanu et al. |

* cited by examiner

INCREASED UPLINK POWER FOR RADIO FREQUENCY COMMUNICATION

CROSS-REFERENCE TO RELATED APPLICATION(S)

This application is a continuation of U.S. patent application Ser. No. 17/450,117, filed Oct. 6, 2021, which claims the benefit of priority of U.S. Provisional Patent Application No. 63/088,599, filed Oct. 7, 2020, the disclosures of each of which are hereby incorporated by reference in their entireties herein. Any and all applications for which a foreign or domestic priority claim is identified in the Application Data Sheet as filed with the present application are hereby incorporated by reference under 37 CFR 1.57.

BACKGROUND

Aspects of this disclosure relate to cellular communication systems, and in particular, to systems and methods for high power uplink transmission for frequency division duplex (FDD) communication systems. The Specific Absorption Rate (SAR) is a measure of the energy absorbed per unit mass by a human body when exposed to a radio frequency RF) electromagnetic field. It can be defined as the power absorbed per mass of tissue in watts per kilogram (W/kg). Cellular user equipment (UE) must measure below Specific Absorption Rate (SAR) regulatory limits, and therefore transmit below a maximum average power in the uplink (UL) between the UE and a base station. For instance, FDD systems which transmit and receive continuously, transmit with a maximum average power below a threshold such that the total radiated power (TRP) complies with relevant SAR limits.

SUMMARY OF CERTAIN INVENTIVE ASPECTS

The systems, methods and devices of this disclosure each have several innovative aspects, no single one of which is solely responsible for the desirable attributes disclosed herein.

When communicating indoors, at the cell edge, or under other circumstances in which the link between the UE and base station are at risk of dropping, it is desirable to increase the power of the UL to prevent loss of communication with the base station. Since the power of the UL is limited by regulation, it is desirable to provide a more stable UL connection between the UE and base station without exceeding the regulatory SAR limits.

In one aspect, there is provided a mobile device comprising: an antenna configured to transmit radio frequency signals to a base station via an uplink and receive radio frequency signals from the base station via a downlink; and a front end system coupled to the antenna and configured to transmit and receive the radio frequency signals from the antenna, and duplex the radio frequency signals via frequency division duplexing, the front end system further configured to transmit data on the uplink at a first power level that is higher than a predetermined level and at a finite duty cycle.

The front end system can be further configured to continuously receive data on the downlink.

The predetermined level CAN BE a power limit that is equal to or less than a limit set by a communication standard under which the frequency division duplexing is implemented.

An average power level of the radio frequency signals transmitted on the uplink via frequency division duplexing can be less than the predetermined level.

The front end system can include a power amplifier configured to amplify the radio frequency signals provided to the antenna, a low noise amplifier configured to receive the radio frequency signals received from the base station, and a duplexer coupling the power amplifier and the low noise amplifier to the antenna.

The duplexer can be configured to handle additional transmit power received from the power amplifier and increase isolation between the power amplifier and the low noise amplifier to suppress leakage from the power amplifier into the low noise amplifier.

The front end system can be further configured to increase a data rate of the radio frequency signals transmitted via the uplink by increasing the order of modulation of the radio frequency signals.

The front end system can be further configured to transmit the data on the uplink at the first power level in response to determining that transmitting the data on the uplink at a second power level that is less than the predetermined level would result in either data rate or call drops.

In another aspect, there is provided a front end system comprising: a power amplifier configured to amplify a transmit radio frequency signal; a low noise amplifier configured to receive a receive radio frequency signal; and an antenna switch module configured to selectively connect the power amplifier and the low noise amplifier to an antenna, the front end system configured to duplex the transmit and receive radio frequency signals via frequency division duplexing and transmit data on an uplink to a base station at a first power level that is higher than a predetermined level and at a finite duty cycle.

The front end system can be further configured to continuously receive data on a downlink with the base station.

The predetermined level can be a power limit that is equal to or less than a limit set by a communication standard under which the frequency division duplexing is implemented.

An average power level of the radio frequency signals transmitted on the uplink via frequency division duplexing can be less than the predetermined level.

The front end system can further comprise a duplexer coupling the power amplifier and the low noise amplifier to the antenna via the antenna switch module.

The duplexer can be configured to handle additional transmit power received from the power amplifier and increase isolation between the power amplifier and the low noise amplifier to suppress leakage from the power amplifier into the low noise amplifier.

The front end system can be further configured to increase a data rate of the radio frequency signals transmitted via the uplink by increasing the order of modulation of the radio frequency signals.

The front end system can be further configured to transmit the data on the uplink at the first power level in response to determining that transmitting the data on the uplink at a second power level that is less than the predetermined level would result in either data rate or call drops.

In yet another aspect, there is provided a method comprising: determining to communicate with a base station using high power frequency division duplexing; and transmitting a radio frequency signal to the base station via an uplink at a first power level that is higher than a predetermined level and at a finite duty cycle.

The method can further comprise continuously receiving data on a downlink to the base station.

The predetermined level can be a power limit that is equal to or less than a limit set by a communication standard under which the frequency division duplexing is implemented.

An average power level of the radio frequency signals transmitted on the uplink via frequency division duplexing can be less than the predetermined level.

DETAILED DESCRIPTION OF CERTAIN INVENTIVE EMBODIMENTS

Figure 1:
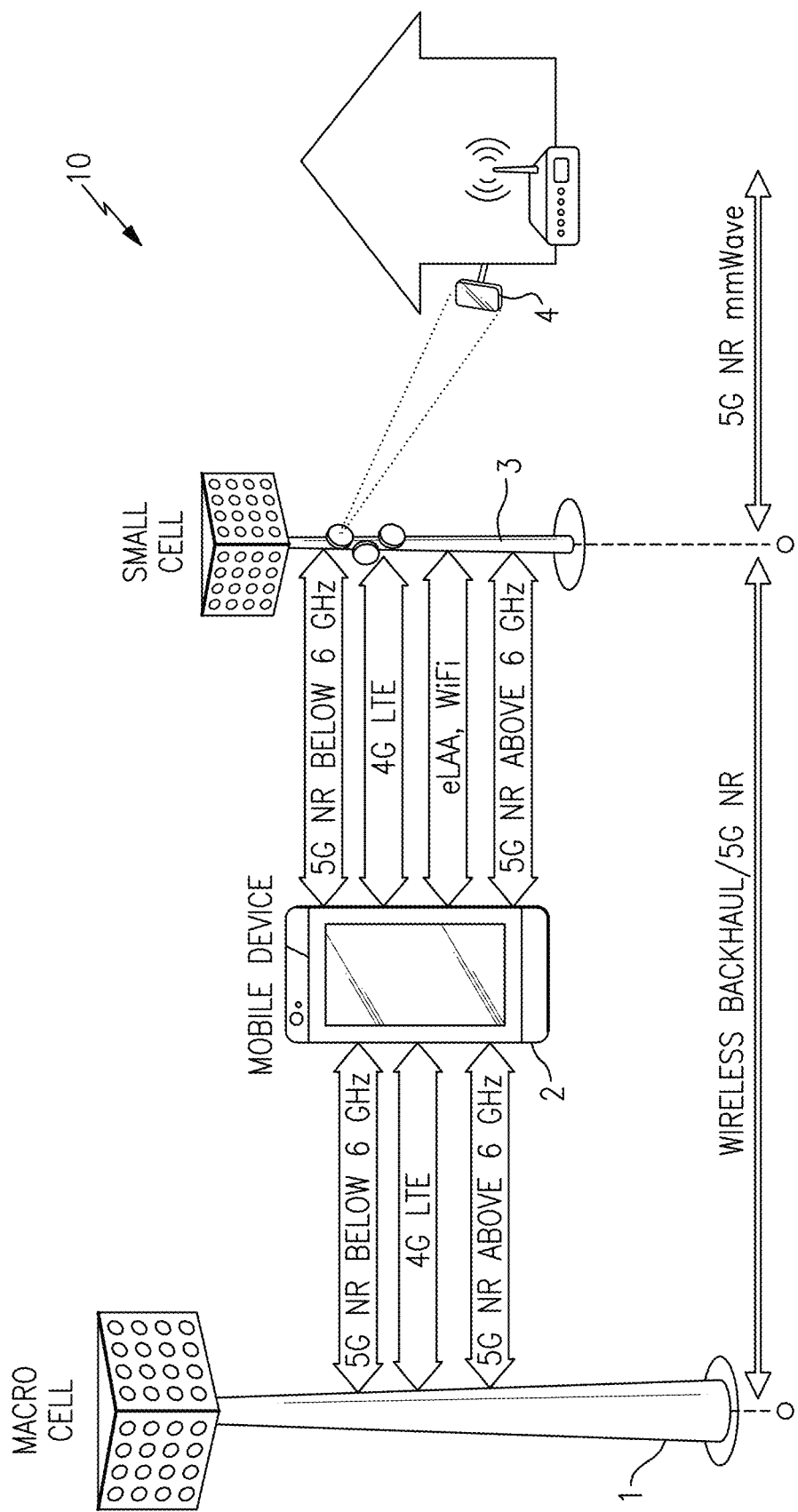
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Traditional cellular user equipment (UE) are limited by Specific Absorption Rate (SAR) based on average power in the uplink (UL) between the UE and a base station. FDD systems can be configured to transmit and receive continuously on different frequency bands. On the other hand, TDD can be configured to transmit and receive in different time slots using an ON/OFF duty cycle at coordinated times, such that users within a cell can transmit and receive on the same channel while avoiding interference issues. High Power UE (HPUE) is an LTE and NR feature in TDD bands that enables higher power UL (PC2) transmission (+3 dB more power vs. FDD, PC3) but restricts the duty cycle <40% to 50% so average power is still equal to or less than transmit power in PC3 FDD operation.

Aspects of this disclosure relate to scheduling duty cycled transmission in FDD UL (e.g., by slot within a frame) instead of continuously transmitting, leading to higher instantaneous power transmission in burst while maintaining lower average power within SAR limits, thereby achieving significantly expanded coverage in use for FDD systems.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IoT), Vehicle-to-Everything (V2X), and High Power User Equipment (HPUE).

3GPP introduced Phase 1 of fifth generation (5G) technology in Release 15, and completed Phase 2 of 5G technology in Release 16 in 2020. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR and beyond.

FIG. 1 is a schematic diagram of one example of a communication network 10. The communication network 10 includes a macro cell base station 1, a mobile device 2, a small cell base station 3, and a stationary wireless device 4.

The illustrated communication network 10 of FIG. 1 supports communications using a variety of technologies, including, for example, 4G LTE, 5G NR, and wireless local area network (WLAN), such as WiFi. Although various examples of supported communication technologies are shown, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient and flexible use of spectrum between transmit and receive that is adjustable by coordinated time slots, associated variable allocation of throughput between transmit and receive directions, enhanced MIMO benefits as the transmit and receive channels are the same, decreased DC consumption in transmit for a given link budget, etc.

As shown in FIG. 1, the mobile device 2 communicates with the macro cell base station 1 over a communication link that uses a combination of 4G LTE and 5G NR technologies. The mobile device 2 also communications with the small cell base station 3. In the illustrated example, the mobile device 2 and small cell base station 3 communicate over a communication link that uses 5G NR, 4G LTE, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

In certain implementations, the mobile device 2 communicates with the macro cell base station 2 and the small cell base station 3 using 5G NR technology over one or more frequency bands that are less than 6 Gigahertz (GHz) and/or over one or more frequency bands that are greater than 6 GHz. For example, wireless communications can utilize Frequency Range 1 (FR1), Frequency Range 2 (FR2), or a combination thereof. In one embodiment, the mobile device 2 supports a HPUE power class specification.

The illustrated small cell base station 3 also communicates with a stationary wireless device 4. The small cell base station 3 can be used, for example, to provide broadband service using 5G NR technology. In certain implementations, the small cell base station 3 communicates with the stationary wireless device 4 over one or more millimeter wave frequency bands in the frequency range of 30 GHz to 300 GHz and/or upper centimeter wave frequency bands in the frequency range of 24 GHz to 30 GHz.

In certain implementations, the small cell base station 3 communicates with the stationary wireless device 4 using beamforming. For example, beamforming can be used to focus signal strength to overcome path losses, such as high loss associated with communicating over millimeter wave frequencies.

The communication network 10 of FIG. 1 includes the macro cell base station 1 and the small cell base station 3. In certain implementations, the small cell base station 3 can operate with relatively lower power, shorter range, and/or with fewer concurrent users relative to the macro cell base station 1. The small cell base station 3 can also be referred to as a femtocell, a picocell, or a microcell.

Although the communication network 10 is illustrated as including two base stations, the communication network 10 can be implemented to include more or fewer base stations and/or base stations of other types. As shown in FIG. 1, base stations can communicate with one another using wireless communications to provide a wireless backhaul. Additionally or alternatively, base stations can communicate with one another using wired and/or optical links.

The communication network 10 of FIG. 1 is illustrated as including one mobile device and one stationary wireless device. The mobile device 2 and the stationary wireless device 4 illustrate two examples of user devices or user equipment (UE). Although the communication network 10 is illustrated as including two user devices, the communication network 10 can be used to communicate with more or fewer user devices and/or user devices of other types. For example, user devices can include mobile phones, tablets, laptops, IoT devices, wearable electronics, and/or a wide variety of other communications devices.

User devices of the communication network 10 can share available network resources (for instance, available frequency spectrum) in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user device a unique code, space-divisional multiple access (SDMA) in which beamforming is used to provide shared access by spatial division, and non-orthogonal multiple access (NOMA) in which the power domain is used for multiple access. For example, NOMA can be used to serve multiple user devices at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user device. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to eMBB, uRLLC, and/or mMTC.

A peak data rate of a communication link (for instance, between a base station and a user device) depends on a variety of factors. For example, peak data rate can be affected by channel bandwidth, modulation order, a number of component carriers, and/or a number of antennas used for communications.

For instance, in certain implementations, a data rate of a communication link can be about equal to $M*B*\log_2(1+S/N)$, where M is the number of communication channels, B is the channel bandwidth, and S/N is the signal-to-noise ratio (SNR).

Accordingly, data rate of a communication link can be increased by increasing the number of communication channels (for instance, transmitting and receiving using multiple antennas), using wider bandwidth (for instance, by aggregating carriers), and/or improving SNR (for instance, by increasing transmit power and/or improving receiver sensitivity).

5G NR communication systems can employ a wide variety of techniques for enhancing data rate and/or communication performance.

Figure 2A:
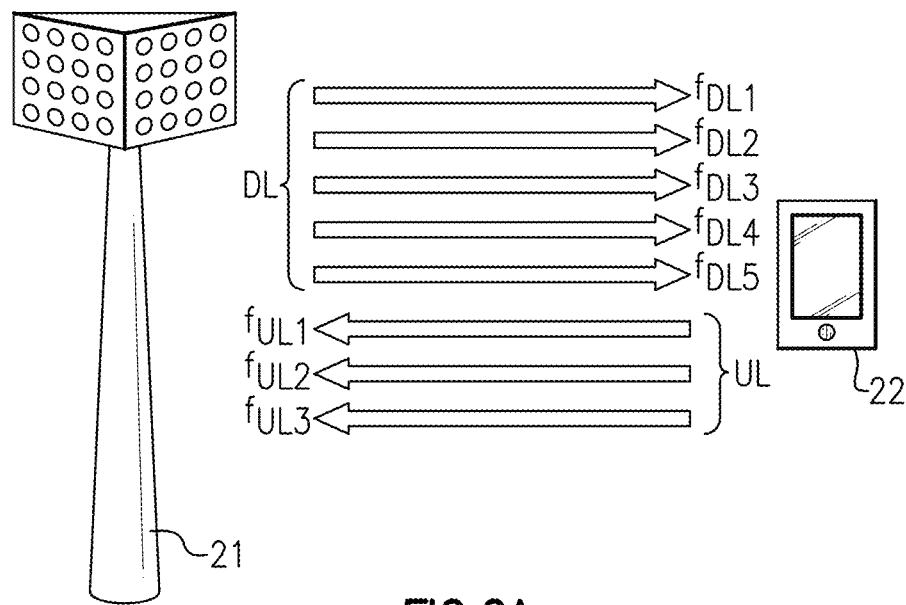
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
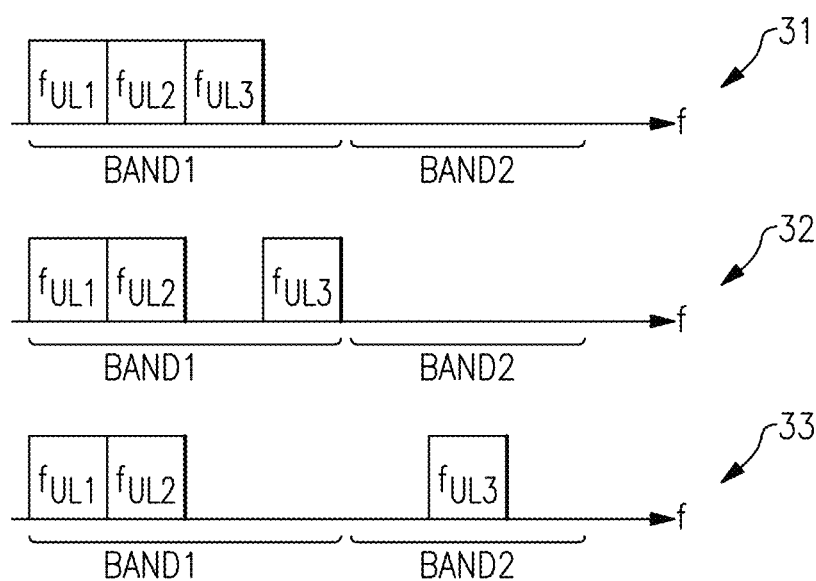
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
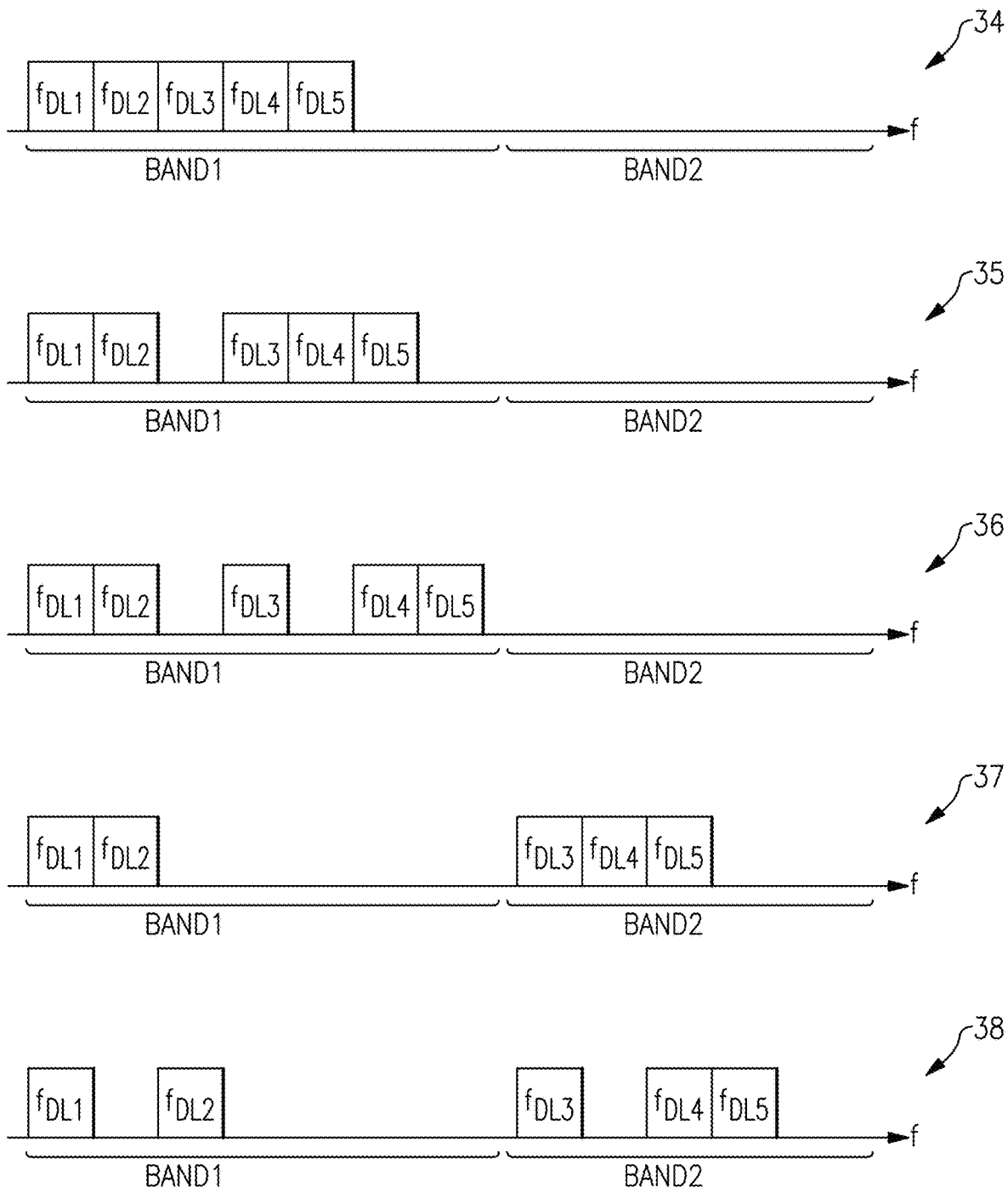
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3A:
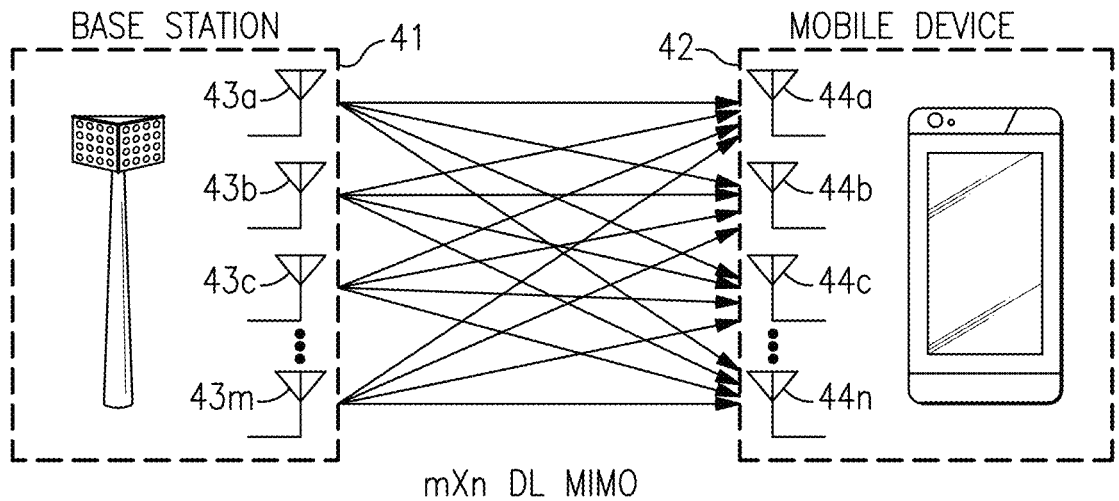
FIG. 3A is a schematic diagram of one example of a downlink channel using multi-input and multi-output (MIMO) communications.
Figure 3B:
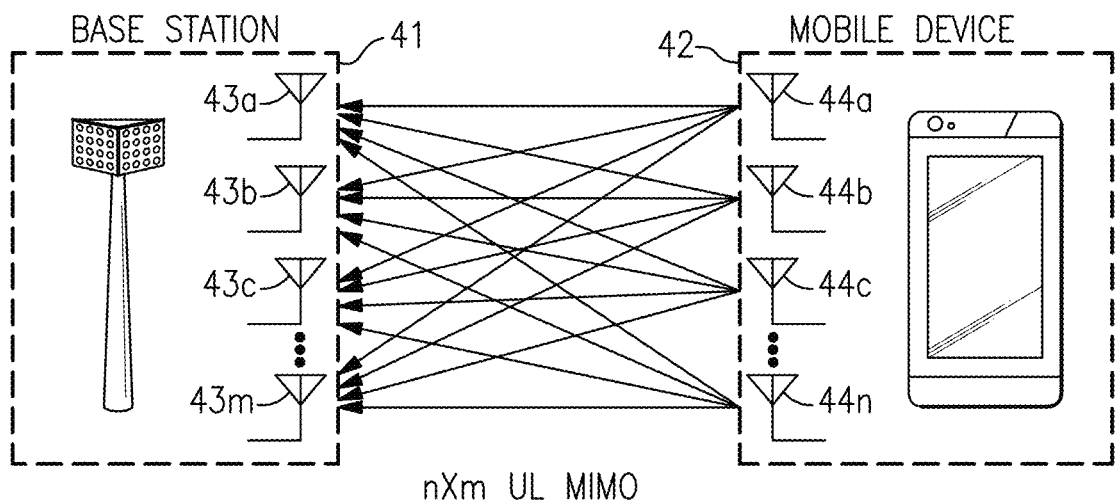
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
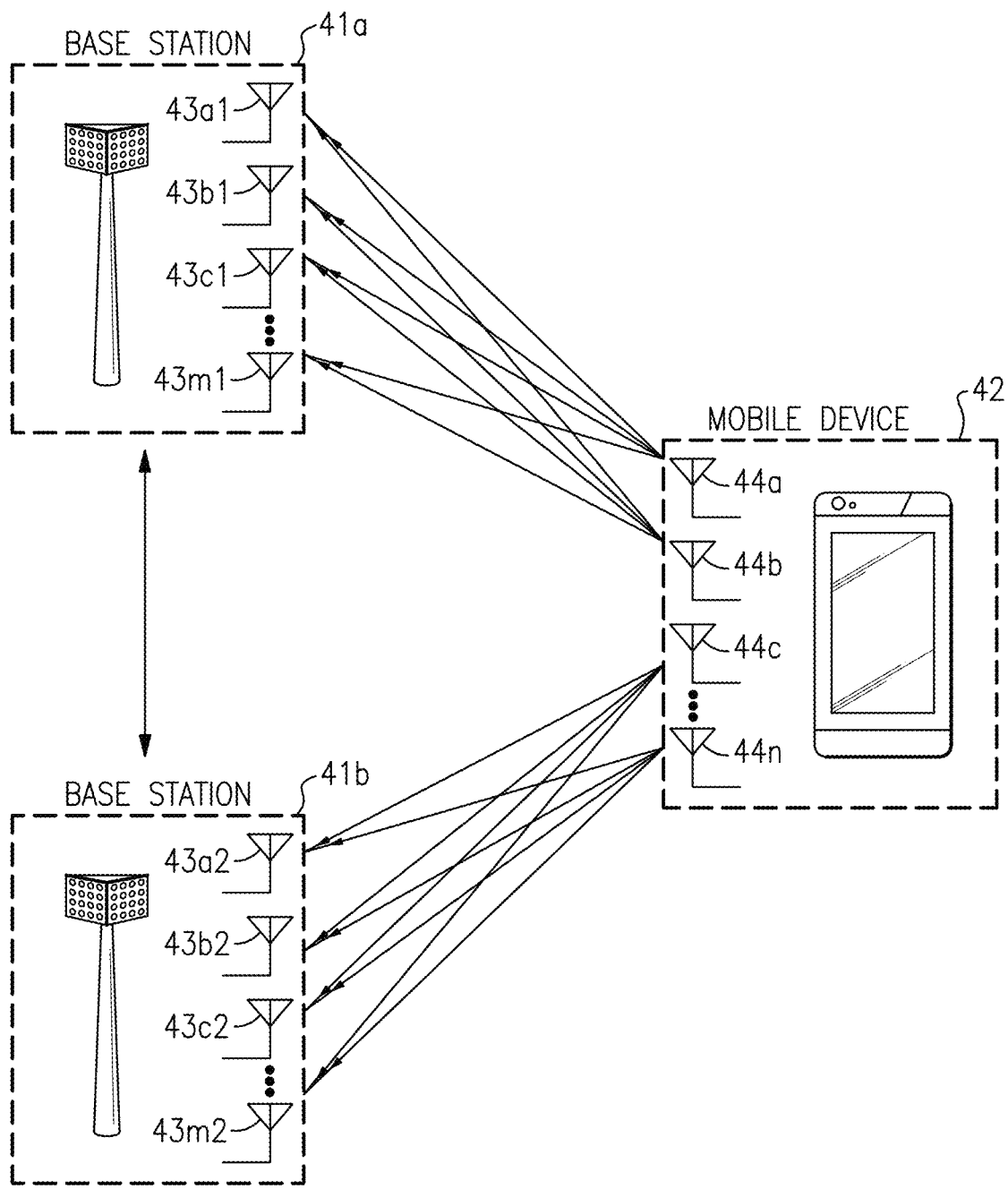
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, . . . 44n of the mobile device 42. Additionally, a first portion of the uplink transmissions are received using M antennas 43a1, 43b1, 43c1, . . . 43m1 of a first base station 41a, while a second portion of the uplink transmissions are received using M antennas 43a2, 43b2, 43c2, . . . 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

Figure 4:
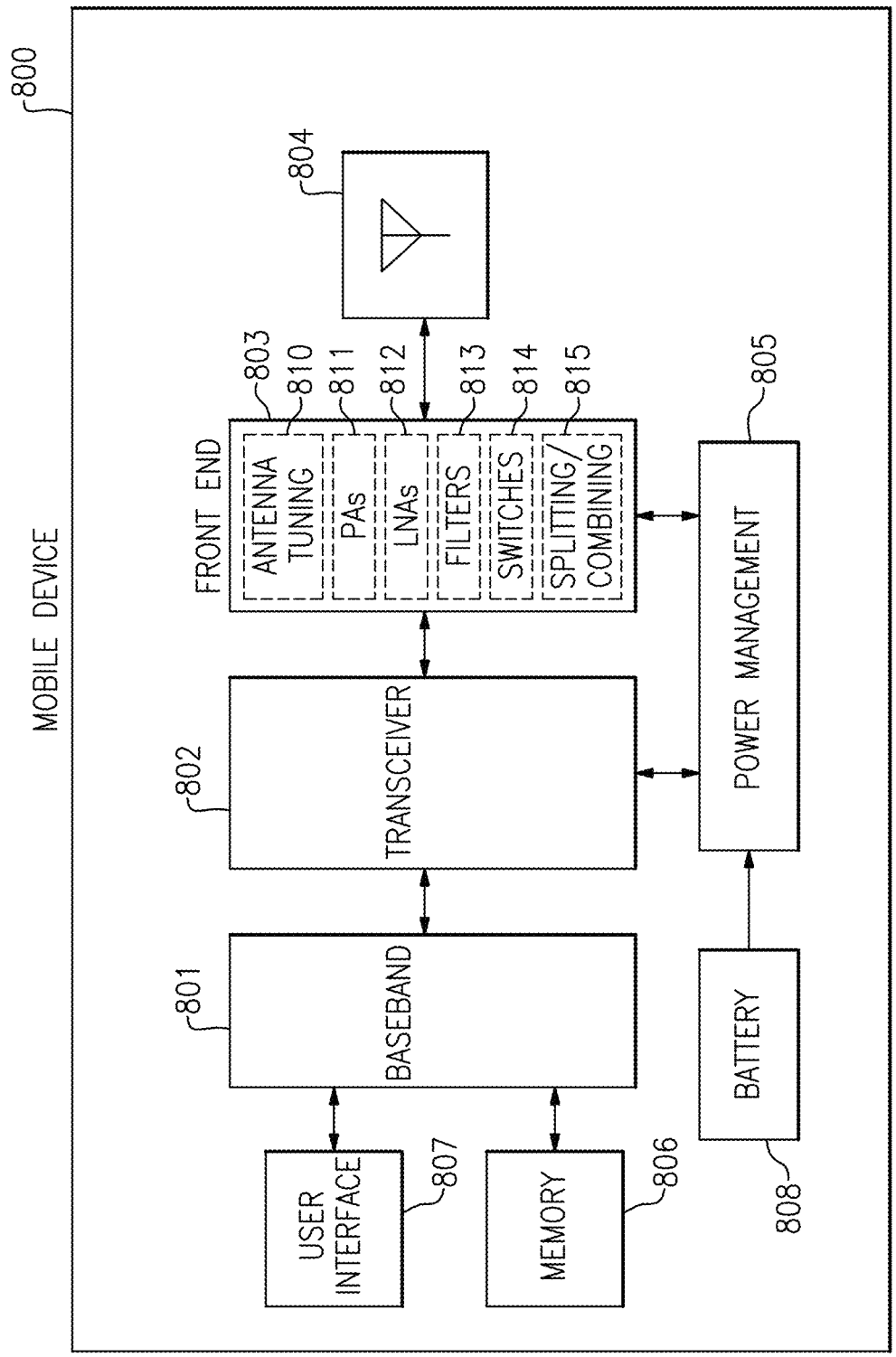
FIG. 4 is a schematic diagram of one embodiment of a mobile device.

FIG. 4 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 4 as the transceiver 802. In one example, separate components (for instance, separate circuits or dies) can be provided for handling certain types of RF signals.

The front end system 803 aids in conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 4, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 4, the power management system 805 receives a battery voltage from the battery 808. The battery 808 can be any suitable battery for use in the mobile device 800, including, for example, a lithium-ion battery.

Examples of Circuits for High Power Uplink Transmission for FDD Communication Systems Modern cellular communication networks are typically limited in coverage extent by two factors: capacity and the need to provide a target level of data rate and service to a large number of people in a dense area, and/or coverage range which is typically limited by uplink (UL) power from battery powered mobile handsets or wearable devices.

The capacity issue can be addressed in certain environments via the establishment of smaller cells and densification of the network. Coexistence interference issues can become more prevalent in such radio environments, and thus higher uplink power may not necessarily be favored depending on how the uplink power is scheduled to overcome coexistence challenges.

The UL-limited coverage issue largely the result of an asymmetry in the power between the transmitter from base station and mobile handset. Downlink (DL) power from the base station is typically in the range of 40 W from high performance antennas and typically less than ¼ W from the mobile device. The receivers for both the base station and mobile handset are much closer to one another, both close to the theoretical physical noise limits.

Operation at the cell edge (e.g., when the user is substantially equally distant from multiple base stations) requires the highest power levels and typically reduces the modulation allocation and backs off the order of modulation to narrower bandwidths and simple QPSK in order to preserve the signal-to-noise ratio of the UL modulation, LTE being made up of individual resource blocks (RBs). The DL can operate without changes in allocation as the transmission of the entire channel and multiple channels for the DL is typically operated at maximum power from the base station. The UL must work hard and make these trade-offs to preserve UL SNR and maintain the link back to the eNodeB (LTE) or gNodeB(NR).

Additionally, because cellphones are presently used approximately 75% of the time indoors where building penetration (especially at higher frequencies) becomes a significant challenge, cellphones may be effectively operating at the cell edge (e.g., where the link SNR degrades to a point where the link and service is at risk of being dropped, similar to the risks associated at the cell edge).

The call drop statistics and buffering indicated during low data rate periods are perhaps one of the most critical user experience statistics driving customer churn and dissatisfaction and drive much of the consumer perception of the carrier services. In continuous transmission of Frequency-Division Duplex (FDD), UL power is limited by regulatory safety limits of average power—termed Specific Absorbed Radiation (SAR) as indicators of safe amounts of electromagnetic energy absorbed in human tissue. It is not possible to increase the maximum FDD UL power because of this limit, and the Total Radiated Power (TRP) is made as high as possible to meet carrier requirements, while still meeting the regulatory maximum average power based on SAR.

Aspects of this disclosure relate to systems and methods which can provide improved UL power transmission for FDD communication without exceeding the SAR regulatory limit.

Figure 5:
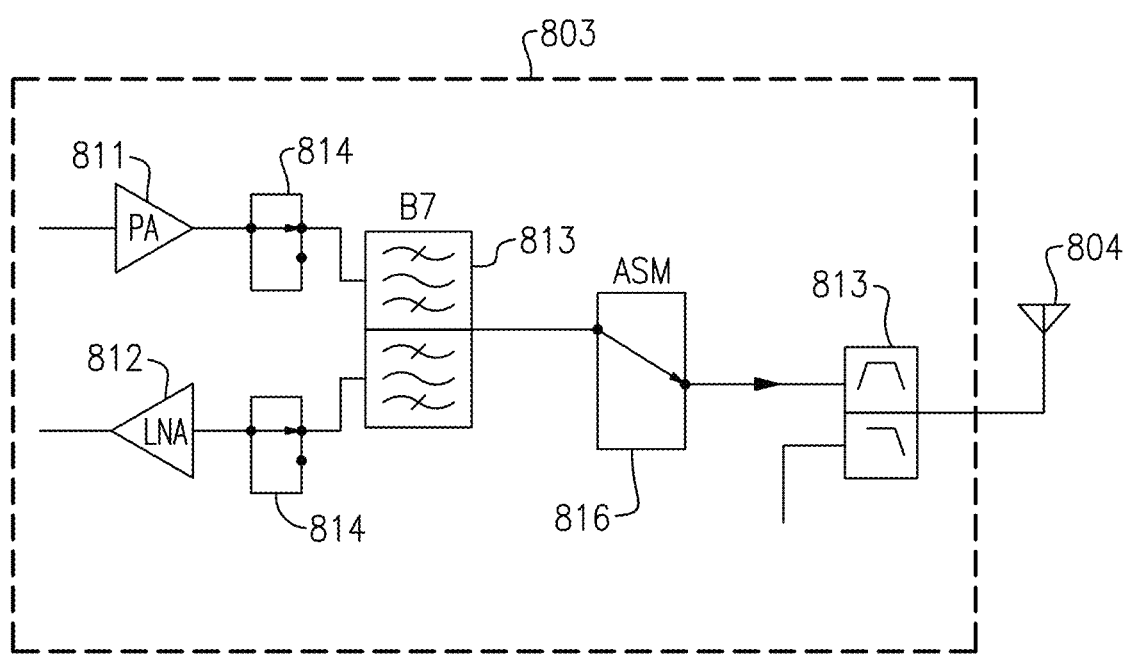
FIG. 5 is a simplified schematic diagram of one embodiment of a radio front end system which can be implemented in the mobile device illustrated in FIG. 4 in accordance with aspects of this disclosure.

FIG. 5 is a simplified schematic diagram of one embodiment of a radio front end system 803 which can be implemented in the mobile device 800 illustrated in FIG. 4 in accordance with aspects of this disclosure. In the illustrated embodiment, the front end system 803 is connected to an antenna 804 and includes a power amplifier (PA) 811, a low noise amplifier (LNA) 812, a plurality of filters 813, a plurality of switches 814, an antenna switch module (ASM) 816, and a duplexer 817. While FIG. 5 illustrates one embodiment of a front end model 803 that can be used to communicate using FDD, other implementations are possible.

Figure 6A:
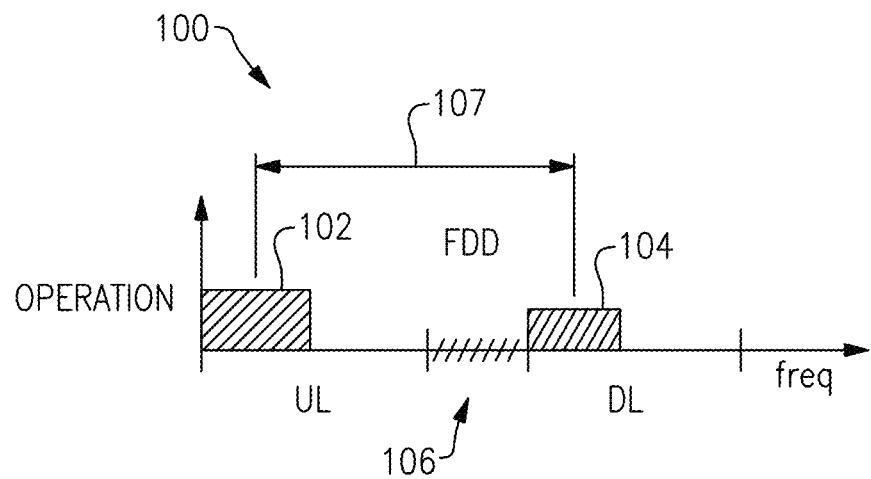
FIG. 6A is a graph illustrating an implementation of frequency division duplex (FDD) communication in the frequency domain in accordance with aspects of this disclosure.

FIG. 6A is a graph illustrating an implementation of FDD communication 100 in the frequency domain in accordance with aspects of this disclosure. In particular, FIG. 6A illustrates the operation of an UL channel 102 and the operation of a DL channel 104 with respect to frequency. As shown in FIG. 6A, when communicating using FDD, the UL channel 102 may be confined to a first frequency range while the DL channel 104 is confined to a second frequency range. The UL channel 102 and the DL channel 104 may be spaced apart by a "Duplex Spacing" 107, and the allowed frequency passband range of the UL channels 103 is separated by the allowed frequency passband range of the DL channels 105 by a "Duplex Gap" frequency separation 106.

FDD communication 100 such as the implementation illustrated in FIG. 6A is a type of radio frequency communications that uses different frequencies (e.g., the frequencies for the UL channel 102 and the frequencies for the DL channel 104) for transmitting and receiving signals. FDD can provide a number of advantages, such as high data rates and low latency.

Figure 6B:
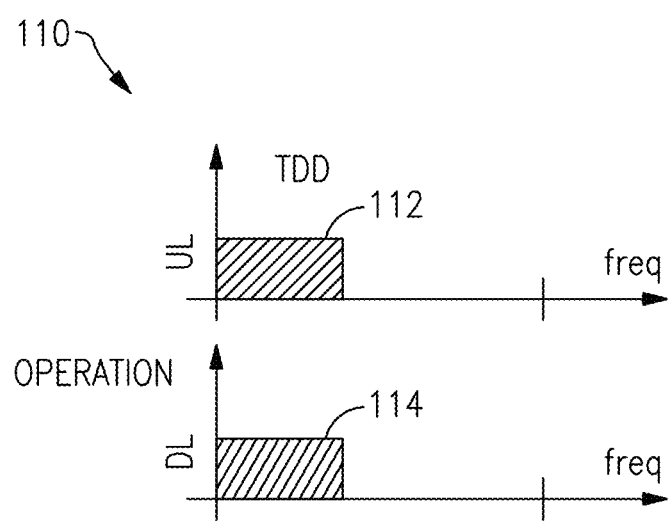
FIG. 6B is a graph illustrating an implementation of time-division duplexing (TDD) communication in the frequency domain in accordance with aspects of this disclosure.

FIG. 6B is a graph illustrating an implementation of TDD communication 110 in the frequency domain in accordance with aspects of this disclosure. In particular, FIG. 6B illustrates the operation of an UL channel 112 and the operation of a DL channel 114 with respect to frequency, at different time periods (UL and DL are non-concurrent in TDD operation). As shown in FIG. 6B, when communicating using TDD, the UL channel 112 and the DL channel 114 may occupy the same frequency channel. Instead of being separated by frequency, the UL and DL channels 112 and 114 are instead separated in time (not illustrated) to avoid interference between the UL and DL channels 112 and 114.

As shown in FIG. 6B, TDD communication 110 is a type of radio frequency communications that uses about the same frequency (e.g., the frequencies for the UL and DL channels 112 and 114) for transmitting and receiving signals, and in which transmit and receive communications are switched in time. TDD can provide a number of advantages, such as efficient and flexible use of spectrum between transmit and receive that is adjustable by coordinated time slots, associated variable allocation of throughput between transmit and receive directions, enhanced MIMO benefits as the transmit and receive channels are the same, decreased DC consumption in transmit for a given link budget, etc.

Figure 7A:
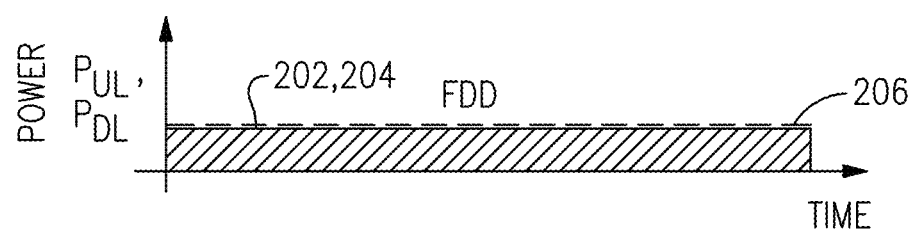
FIG. 7A is a graph illustrating an implementation of FDD communication in the time domain in accordance with aspects of this disclosure.

FIG. 7A is a graph illustrating an implementation of FDD communication 200 in the time domain in accordance with aspects of this disclosure. In particular, in the illustrated FDD communication 200, the power of an UL 202 and the power of a DL 204 are shown with respect to time. As shown in FIG. 7A, the UL 202 and the DL 204 overlap in time and are substantially continuous in time. Also shown in FIG. 7A is a power limit 206, which may be less than or equal to a limit set by the communication standard under which the FDD communication 200 is implemented. For example, the power class 3 (PC3) standard may set a limit for UL 202 power at +23 dBm+/−2 dB for FDD continuous UL 202 transmission, and thus, in some implementations, the power limit may be set at +24 dBm to ensure the UL 202 power remains below the +25 dBm=+23 dBm+2 dB maximum set by the PC3 standard.

Figure 7B:
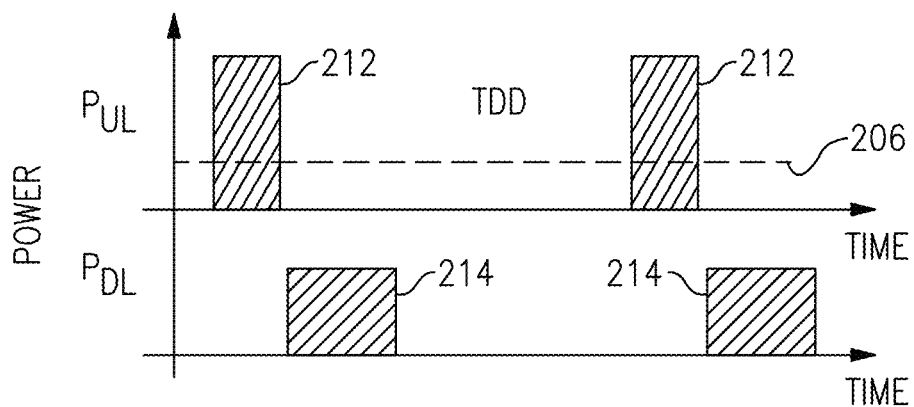
FIG. 7B is a graph illustrating an implementation of TDD communication in the time domain in accordance with aspects of this disclosure.

FIG. 7B is a graph illustrating an implementation of TDD communication 210 in the time domain in accordance with aspects of this disclosure. In particular, in the illustrated TDD communication 210, the power of an UL 212 and the power of a DL 214 are shown with respect to time. As shown in FIG. 7B, the UL 212 and the DL 214 are instead separated in time to reduce or prevent interference. Also shown in FIG. 7B is the power limit 206, which may be the same as the power limit for the UL 202 for the FDD communication 200 of FIG. 7A.

The FIG. 7B implementation of TDD communication 210 can address the UL-limited power issues from the mobile device by increasing the power of transmission above the power limit 206 for a finite duty cycle. In some embodiments, the TDD communication 210 can be split into a plurality of frames, each frame having a plurality of slots. Depending on the frame configuration and how many of the time slots are dedicated to the UL 212 for each frame, the UL 212 power can be averaged over a number of idle slots within the frame in addition to the slots used by the UE for UL 212 transmission.

In one example, if the power 206 limit for UL 212 power is Pmax for FDD continuous UL 212 transmission, then for a comparable TDD system such at the implementation of FIG. 7B that transmits in bursts with a duty cycle, D, the average power may be calculated as Pmax*D. By averaging the power of the UL 212 over the entire frame, the in-burst UL 212 power can be significantly increased as long as the duty cycle allows the average power to remain low and within SAR limits. HPUE requirements have been established in the 3GPP LTE-A standard to allow a new power class (PC2) to transmit +26 dBm in UL 212 based on the limitation that the duty cycle not exceed 40%. This standard ensures that the average power does not exceed roughly +22 dBm and is below the FDD established acceptable limits (e.g., SAR limits), while able to transmit twice the in-burst power, and thereby extend the range more than 25% from the tower, etc. While the implementation of FIG. 7B can increase the transmission power for the UL 212 for TDD communication 210, aspects of this disclosure also relate to expanding this increased power to FDD systems.

Figure 8:
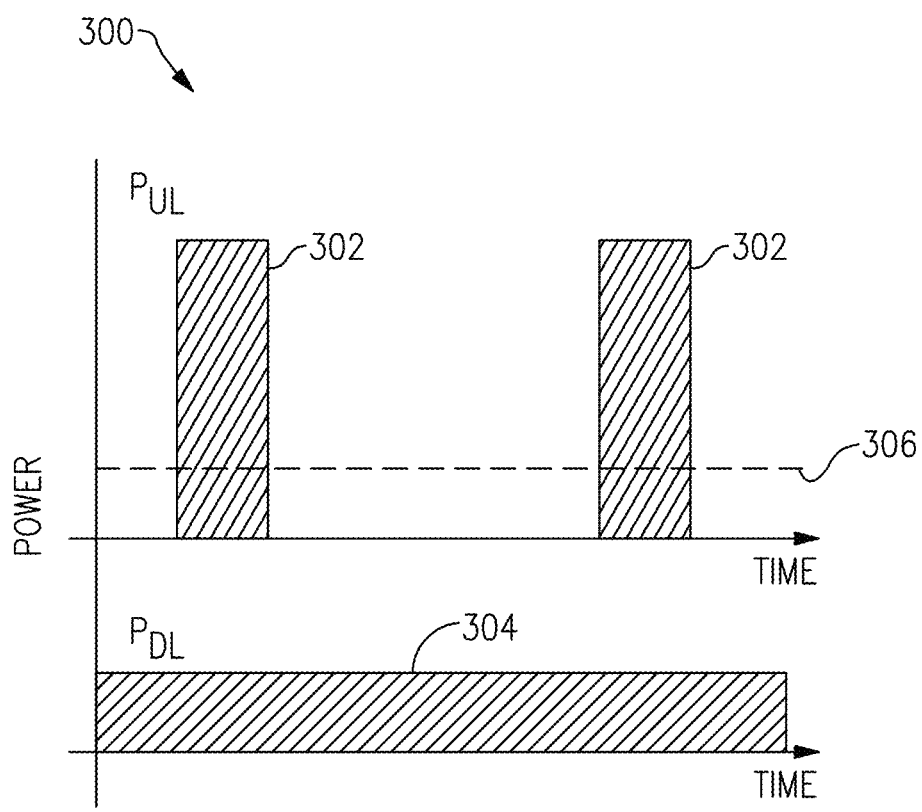
FIG. 8 is a graph illustrating an implementation of FDD communication having increased UL power in the time domain in accordance with aspects of this disclosure.

FIG. 8 is a graph illustrating an implementation of FDD communication 300 having increased UL 302 power in the time domain in accordance with aspects of this disclosure. In particular, in the illustrated FDD communication 300, the power of an UL 302 and the power of a DL 304 are shown with respect to time. As shown in the implementation of FIG. 8, the UL 302 has a finite duty cycle while the DL is substantially continuous in time. Also shown in FIG. 8 is an average power limit 306, which may be less than or equal to a limit set by the communication standard under which the FDD communication 300 is implemented. In some implementations, the power limit 306 may be the same as the power limit 206 from the implementations of FIGS. 7A and 7B.

As shown in FIG. 8, the UL 302 power can be duty cycled in the FDD transmit band 300 such that the instantaneous or "in-burst" power of the UL 302 can be increased compared to the continuous transmission implementation shown in FIG. 7A. The average power of the UL 302 can be maintained below the power limit 306 by maintaining a finite duty cycle while also enabling much larger in-burst UL 302 power. Averaging the UL 302 power across the idle frame time enables the average UL 302 power to be maintained below the power limit 306.

In order to provide the UL 302 having a finite duty cycle, the base station scheduler may be managed across all the FDD UL 302 channels operated with a finite duty cycle. The timing of the UL 302 channels is already controlled at the base station and the implementation of timing-advance can be managed in a manner similar to the implementation for the UL 212 of TDD communications 210. The use of a finite duty cycle may in the UL 302 may reduce the data rate naturally, however, this reduction is acceptable in many situations because of the asymmetry in the network traffic that is driving more than 90% DL 304 data rate, mostly due to video downloads, etc.

High power finite duty cycle TDD systems have shown that the higher SNR provided by the HPUE in-burst UL 212 power can actually increase the data rate in-burst through support of higher order modulation, etc. such that the negative impact on data rate is limited, and in some cases eliminated entirely. In order to provide higher power from the UL 302 for FDD communications 300, some implementations may include minor changes within the front end system 803. For example, referring to FIG. 5, the duplexer 817 may be re-sized to handle the higher UL 302 power and manage harmonic generation/filtering issues, both for the transmit-antenna through a band-pass filter on the transmit side, as well as for any increased transmit-receive isolation and receive filter linearity that may be required to suppress the transmit leakage and receive band noise coming from the higher power on the transmit side of the duplexer 817. The PA 811 of the FDD UL transmit path may be configured to support in-burst UL power amplitudes which are greater than conventional continuous transmission FDD UL transmit paths.

By enabling a transmission mode where FDD UL 302 can be effectively duty cycled and run in a "TDD-like" operation (e.g., as shown in FIG. 7B), the in-burst UL 302 power can be significantly increased, average power maintained, and the FDD band can significantly improve the overall UL-limited coverage performance and cell-edge user experience. The net impact of implementation of aspects of this disclosure is potentially wider cell areas for lower implementation costs from the carrier and fewer base stations, higher data rates throughout the cell and especially at cell edge. Aspects of this disclosure can further provide less call drop and coverage complaints from subscribers.

Figure 9:
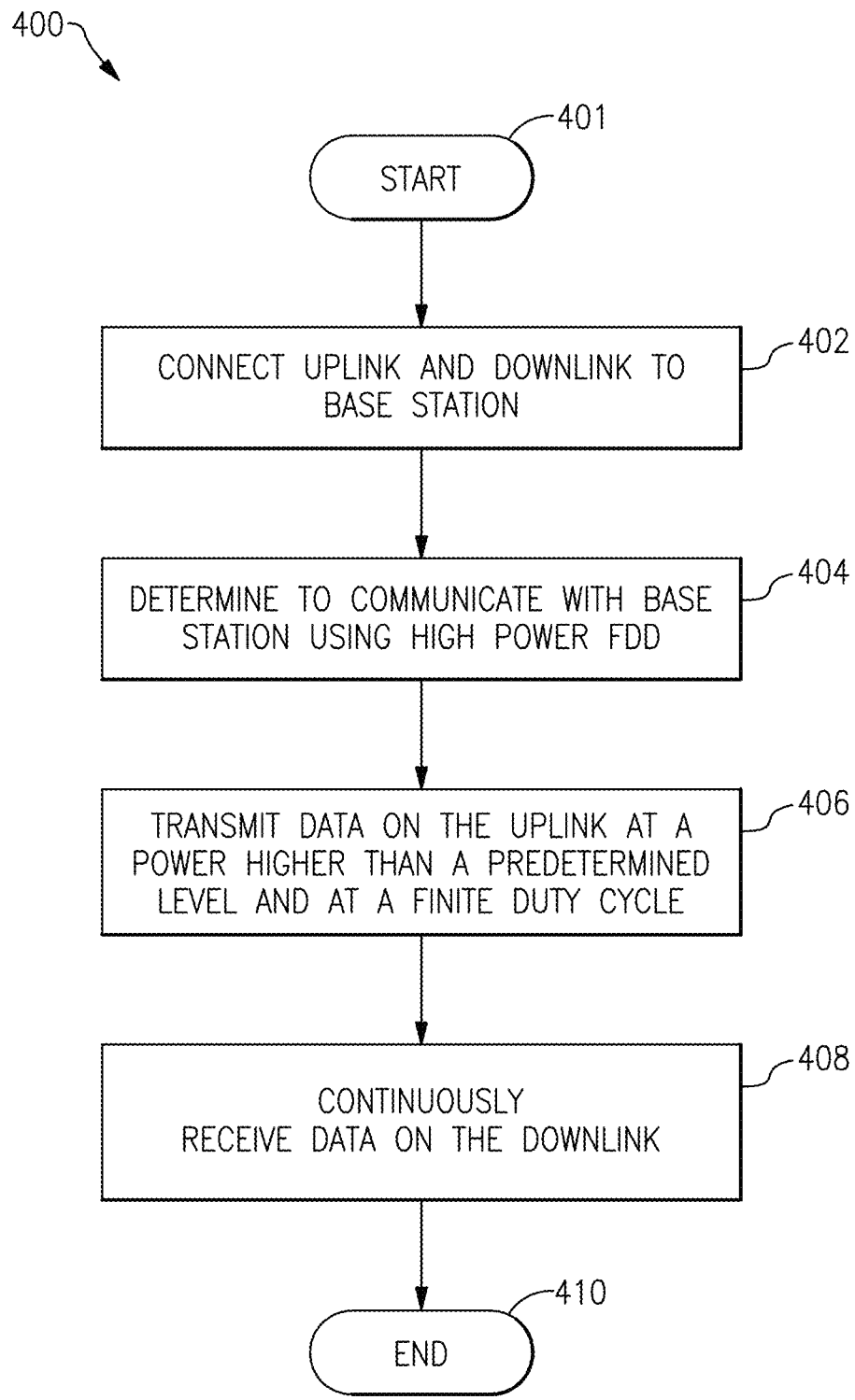
FIG. 9 is an example flowchart illustrating a method for high power FDD UL communications in accordance with aspects of this disclosure.

FIG. 9 is an example flowchart illustrating a method 400 for high power FDD UL communications in accordance with aspects of this disclosure. The method 400 may be performed by an HPUE to provide high power FDD communications with a base station. A similar process may be performed by the base station communicating with the HPUE.

The method 400 starts at block 401. At block 402, the HPUE connects the UL and DL to a base station. At block 404, the HPUE determines to communicate with the base station using high power FDD. This determination may be based on communications in compliance with an RF communication standard in certain implementations. For example, nominal operation may involve continuous UL FDD (e.g., as shown in FIG. 7A). In response to determining that there is a need for higher capacity throughput, the base station may trigger TDD time-division multiplexing to share resources among more users. When the base station detects cell-edge user experience degradation in SNR for modulation order, the base station may trigger high power FDD UL operation. In other situations, simply maintaining the TDD link for longer than a threshold period of time may trigger the high power FDD UL operation. In still other situations, the base station may transition directly from continuously UL FDD to high power UL operation based on any one of the triggers.

The thresholds used in these triggers may depend on capacity, coexistence, and user experience conditions. Other possible triggers include data rate requirements, maintaining connectivity with the base stations, and capacity. In other aspects, the determination in block 404 may be made in response to a low power FDD communication (e.g., as shown in FIG. 7A) having insufficient power to maintain the UL to the base station without data rate or call drops.

At block 406, the HPUE can transmit data on the UL at a power that is higher than a predetermined level (e.g., higher than the power limit 306 shown in FIG. 8) and at a finite duty cycle. The average power of the UL communication in block 406 may be less than the predetermined level. At block 408, the HPUE can continuously receive data on the DL (e.g., without a duty cycle). The data received on the DL may be at a second power that is lower than the predetermined level. The method 400 ends at block 410.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
an antenna; and
a front end system coupled to the antenna and configurable in at least one mode to transmit and receive frequency division duplex radio frequency signals with the antenna via an uplink and a downlink, respectively, and to transmit data on the uplink according to a duty cycle at an in-burst power level that is higher than a first power level while maintaining an average power level less than or equal to the first power level.

2. The mobile device of claim 1 wherein the front end system is further configurable in the at least one mode to continuously receive data on the downlink.

3. The mobile device of claim 1 wherein the first power level is a limit set by a communication standard.

4. The mobile device of claim 1 wherein the duty cycle is less than 50%.

5. The mobile device of claim 1 wherein the front end system includes a transmit amplifier configured to amplify the frequency division duplex radio frequency signals provided to the antenna, and a receive amplifier configured to receive the frequency division duplex radio frequency signals received via the antenna.

6. The mobile device of claim 5 further comprising a radio frequency receive filter configured to filter the frequency division duplex radio frequency signals provided to the receive amplifier and a radio frequency transmit filter configured to filter the frequency division duplex radio frequency signals amplified by the transmit amplifier.

7. The mobile device of claim 1 wherein the front end system is further configured to switch from operating in a continuous frequency division duplex transmit mode to operating in the at least one mode in response to a determination that continuing to operate in the continuous frequency division duplex transmit mode is insufficient to maintain the uplink at a desired quality level.

8. A front end system comprising:
a transmit amplifier configured to amplify a transmit frequency division duplex radio frequency signal; and
a receive amplifier configured to receive a receive frequency division duplex radio frequency signal, the front end system configurable in at least one mode to transmit with an antenna coupled to the front end system the amplified transmit frequency division duplex radio frequency signal via an uplink, and to receive with the antenna the receive frequency division duplex radio frequency signal via a downlink, and to transmit data on the uplink according to a duty cycle at an in-burst power level that is higher than a first power level while maintaining an average power level less than or equal to the first power level.

9. The front end system of claim 8 further configurable in the at least one mode to continuously receive data on the downlink.

10. The front end system of claim 8 wherein the first power level is a limit set by a communication standard.

11. The front end system of claim 8 wherein the duty cycle is less than 50%.

12. The front end system of claim 8 further comprising a radio frequency receive filter configured to filter the receive frequency division duplex radio frequency signal provided to the receive amplifier and a radio frequency transmit filter configured to filter the transmit frequency division duplex radio frequency signal amplified by the transmit amplifier.

13. The front end system of claim 8 further configured to switch from operating in a continuous frequency division transmit mode to operating in the at least one mode in response to a determination that continuing to operate in the continuous frequency division transmit mode is insufficient to maintain the uplink at a desired quality level.

14. A method of operating a mobile device comprising:
connecting the mobile device to a remote system via a radio frequency division duplex uplink and a radio frequency division duplex downlink;
determining to communicate using frequency division duplexing that transmits with a duty cycle; and
transmitting a frequency division duplex radio frequency signal via the frequency division duplex uplink according to the duty cycle at an in-burst power level that is higher than a first power level while maintaining an average power level less than or equal to the first power level.

15. The method of claim 14 wherein determining to communicate using frequency division duplexing that transmits with a duty cycle is in response to signal-to-noise ratio degradation.

16. The method of claim 14 wherein determining to communicate using frequency division duplexing that transmits with a duty cycle is in response to detecting user experience degradation.

17. The method of claim 14 wherein determining to communicate using frequency division duplexing that transmits with a duty cycle is in response to detecting maintaining a time domain duplex link for longer than a threshold period of time.

18. The method of claim 14 further comprising continuously receiving data on the radio frequency division duplex downlink.

19. The method of claim 14 wherein the first power level is a power limit set by a communication standard.

20. The method of claim 14 wherein the remote system is a base station.

\* \* \* \* \*